3,509,126
RECOVERY OF HIGH PURITY ARABINOGA-
LACTAN FROM LARCH
Klaus Dahl, Munich, Germany, assignor to Columbia
Cellulose Company Limited, Vancouver, British Columbia, Canada, a corporation of Canada
No Drawing. Filed Sept. 7, 1967, Ser. No. 665,978
Int. Cl. C08b 19/12
U.S. Cl. 260—209.5                    11 Claims

ABSTRACT OF THE DISCLOSURE

Arabinogalactan of high purity is recovered from solid particulate wood of the larch tree. Arabinogalactan and aromatic impurities are removed from the wood by aqueous solvent extraction, subjected to conditions in which the solubility of the aromatic impurities is increased, and the arabinogalactan product is selectively precipitated. The product may be a water-soluble white solid of at least 99 percent purity which is suitable for use as a substitute for gum arabic and other natural gums.

BACKGROUND OF INVENTION

Arabinogalactan obtained from the larch tree, as is known to those skilled in the art, is a complex naturally occurring highly branched polymer of arabinose and galactose in a ratio of approximately 1 to 6 respectively having a molecular weight of about 30,000 to about 100,000.

It has been known for many years that the wood of the larch tree contains a substantial quantity of arabinogalactan and other constituents which may be removed by extraction with water. For instance, Canadian Patent Nos. 213,174 and 214,081 disclose broadly the leaching of Western larch with water to remove water-soluble constituents. Canadian Patent No. 740,407 discloses a further process for removing arabinogalactan from larch wood while combined with an aqueous solvent in which the mixture is compressed to express the extract. Also, various countercurrent leaching procedures have been proposed to increase the efficiency of the extraction of water-soluble constituents from larch. It has been recognized, however, that aromatic impurities are also extracted from larch wood by aqueous solvents and that the presence of such impurities in the solid arabinogalactan heretofore recovered has limited the extent of possible end use for the product. For instance, arabinogalactan marketed today is commonly a tan solid of up to 96 percent purity having a woody odor and taste, which tends to mold excessively upon standing in a 10 percent by weight aqueous solution. The impurities present in the currently marketed product can be traced directly to aromatic constituents removed from the wood along with the extraction of arabinogalactan. When attempts have been made to remove impurities from the extract by charcoal adsorption, there has been a tendency for the charcoal to become dispersed therein, and to be separated only with considerable difficulty.

It is an object of the invention to provide an efficient process for the recovery of high purity arabinogalactan from larch.

It is an object of the invention to provide a process for the recovery of high purity arabinogalactan which is suitable for use in food and medicinal applications as well as in other industrial uses.

It is a further object of the invention to provide a process for the recovery of a high purity arabinogalactan product of improved biological stability which is resistant to molding.

It is another object of the invention to provide a process for the recovery of high purity arabinogalactan which is a white water-soluble solid capable of forming clear, colorless, and tasteless solutions.

It is an additional object of the invention to provide an efficient process for recovering arabinogalactan from larch to form a solid product which is substantially free from the presence of aromatic impurities.

It is a further object of the invention to provide a process for the recovery of arabinogalactan from larch chips which yields a chip by-product which is highly suited for subsequent pulping.

These and other objects, as well as the scope, nature, and utilization of the invention will be apparent from the following detailed description and appended claims.

SUMMARY OF INVENTION

It has now been discovered that an improved process for the recovery of high purity arabinogalactan from larch comprises subjecting solid particulate larch to an aqueous medium whereby arabinogalactan and aromatic impurities initially present in the solid are extracted and dissolved in the aqueous medium, separating the aqueous medium containing arabinogalactan and aromatic impurities dissolved therein from the solid particulate larch, subjecting the aqueous medium containing arabinogalactan and aromatic impurities dissolved therein to conditions whereby the solubility in water-miscible organic solvents of the aromatic impurities is substantially increased without the substantial modification of the properties of the arabinogalactan, selectively precipitating solid arabinogalactan from the resulting aqueous medium by intimate contact with a water-miscible organic solvent which is a nonsolvent for arabinogalactan, and separating solid arabinogalactan of high purity.

The wood of the larch tree contains a considerable amount of organic matter which is soluble in water and is selected as the source of arabinogalactan product, which may be efficiently recovered according to the present invention. For the purposes of the present specification and appended claims the terms "larch" is defined to encompass trees of the genus Larix or the wood thereof. The particularly preferred tree which may serve as the source of the desired product is the Western larch, which is identified as *Larix occidentalis* Nutt. by standard plant nomenclature. It is not essential, however, that wood which is processed be entirely from the genus Larix since minor quantities of other coniferous tree woods may also be present, i.e. up to about 20 percent by weight. For instance, minor quantities of woods such as Douglas fir, balsam fir, Western hemlock and spruce may also be present. While such other coniferous tree woods commonly contain compatible polymeric extractives essentially the same as arabinogalactan, the amount of available extractives is usually minor and such woods accordingly tend to decrease the yield obtainable of polymeric product relative to the amount of wood processed. If one wishes to obtain a maximum product yield, woods other than larch may be separated and discarded prior to treatment of the larch wood according to the present invention.

The larch wood which is processed according to the present invention is comminuted to a solid particulate form by any suitable technique, such as by mechanically chipping, grinding, or shredding. In a preferred embodiment of the invention "standard" larch chips are utilized such as those which are commonly converted to pulp by a standard pulping procedure, e.g. kraft pulping. Following separation of the aqueous medium containing dissolved arabinogalactan the chips may then serve as a premium grade by-product largely free of extractives which is highly suited for efficient pulping according to well-known techniques. Larch chips which are capable of passing a 1¼ inch mesh screen are suitable for use in the process. In a particularly preferred embodiment of the invention the wood chips selected for treatment have a maximum linear dimension of about ¾ inch to about 1½ inch and may contain varying amounts of moisture up to about 60 percent by weight. If desired, more finely divided wood particles may be processed according to the invention, such as sawdust or wood meal. While such extremely finely divided wood is generally inexpensive and may be caused to yield substantial amounts of arabinogalactan according to the present invention, the physical configuration of the same renders the by-product of little value for subsequent pulping according to standard pulping procedures.

The extraction step of the instant process in which arabinogalactan and aromatic impurities are removed or leached from particulate larch may be conducted by aqueous solvent extraction under a variety of extraction conditions. The aqueous medium employed may be essentially pure water, however, various minor amounts of dissolved compounds such as organic acids or surface-active agents which promote the extraction without the substantial degradation of the arabinogalactan product may also be present. The extraction may be conducted by the use of stagnant or circulating systems which are well known in the solvent extraction art. The various circulating or flow extraction techniques because of their increased efficiency are employed in preferred embodiments of the invention. If desired the particulate larch may be compressed in the presence of the aqueous medium according to the teachings of Canadian Patent No. 740,407 in order to hasten the extraction step of the process. In a particularly preferred embodiment of the invention a countercurrent extraction technique is utilized in which a stream of particulate larch is moved through the extractor in one direction and a stream of the aqueous extraction medium is moved in the opposite direction. In a preferred batch embodiment of the invention the weight ratio of particulate larch on an oven dried basis to aqueous medium is about 1 to 4. Sufficient aqueous medium is employed for the complete submersion of the solid particulate larch.

The time required to complete the extraction step of the instant process varies with the efficiency of the particular extraction technique utilized, the particle size of the larch wood, the concentration of extractives present in aqueous medium, and the temperature of the aqueous medium. Suitable extraction times may accordingly vary from about 1 hour to about 48 hours or even longer. Though solutions containing up to 60 percent by weight solids dissolved therein can be obtained, a concentration of solids in the aqueous medium of about 20 percent by weight has been found to be a practical upper concentration limit. If desired, however, significantly lower concentrations of dissolved solids, i.e. about 1 percent by weight arabinogalactan and aromatic impurities may be obtained and subsequently processed according to the present invention, but with an attendant loss of efficiency resulting from the handling of such dilute solutions. If desired, such dilute solutions may be concentrated to a dissolved solids content of about 10 to about 20 percent by weight, such as by vacuum evaporation conducted at an elevated temperature up to about 70° C. prior to carrying out additional steps of the instant process. In a preferred embodiment of the invention relatively dilute solutions of arabinogalactan and aromatic impurities obtained from one or more previous batches are used as the extraction medium for subsequent batches and are thereby enriched in dissolved solids. The presence of previously obtained extract in the aqueous extraction medium tends to accelerate the extraction of additional quantities of the product since it tends to lower the surface tension of the medium and promote diffusion of the solvent into the wood.

In a particularly preferred embodiment of the invention the extraction is conducted at approximately room temperature, i.e. at about 15° C. to about 30° C. When the extraction is conducted at higher temperatures, i.e. up to about 70° C., more deeply colored and turbid extraction solutions are obtained which tend to contain a greater proportion of aromatic impurities than if conducted at about room temperature. A practical weight loss limit for the particulate larch during the extraction step when conducted at room temperature is about 10 percent based upon the total weight of the wood on an oven dried basis, while a practical weight loss limit of about 12 percent is achievable when the extraction is conducted at an elevated temperature. Temperatures above about 70° C. are to be avoided since at such temperatures there is some tendency for the arabinogalactan product to hydrolyze or degrade.

Following completion of the extraction step of the instant process the aqueous medium containing arabinogalactan and aromatic impurities dissolved therein is separated from the solid particulate larch by any suitable technique. For instance, large wood particles may be screened from the extraction medium followed by filtration or centrifugation used alone or in combination to accomplish the separation of suspended matter and wood fines. If desired, the further concentration of the aqueous medium containing dissolved arabinogalactan and aromatic impurities, e.g. to concentration of about 10 to about 20 percent by weight of dissolved solids, may be carried out subsequent to its separation from the solid wood byproduct. An optimum concentration for subsequent processing has been found to be about 10 percent by weight.

The aqueous medium containing arabinogalactan and aromatic impurities dissolved therein is next subjected to conditions whereby the solubility in water-miscible organic solvents of the aromatic impurities is substantially increased without a substantial modification in the properties of the arabinogalactan. The aromatic impurities commonly encountered in the aqueous medium are lignins, flavones, flavonones, and related compounds. For instance, the medium may be subjected to oxidizing conditions in which the aromatic impurities are oxidatively degraded to products which are highly soluble in common water-miscible organic solvents. Such increased solubility promotes the efficient separation of the same in a subsequent step of the instant process. It is essential, however, that the conditions utilized be such that the arabinogalactan molecule is not chemically or physically affected to any significant degree so that the product may be subsequently recovered in a high molecular weight non-degraded form of high purity.

Oxidative degradation of aromatic impurities present in the aqueous medium may be accomplished by reaction with any one of a variety of oxidizing agents. Suitable oxidizing agents which may be utilized without the concomitant degradation of arabinogalactan include chlorine dioxide, chlorine water, peracetic acid and hydrogen peroxide. The particularly preferred oxidizing agent for use in accordance with the present invention is chlorine dioxide. A preferred concentration for the chlorine dioxide oxidizing agent ranges from about 1 percent to about 5 percent by weight based upon the weight (on an oven dried basis) of arabinogalactan and aromatic impurities present in the aqueous medium. Equivalent quantities of other oxidizing agents may be determined by standard techniques, such as the degree of liberation of $I_2$ from KI, and alternatively employed. The oxidizing agent employed is preferably dissolved in water and added to the aqueous medium with stirring. For instance, about 2.5 grams of chlorine dioxide may be dissolved per liter of water and the resulting oxidizing solution mixed with an equal volume of an aqueous medium containing about 10 percent by weight arabinogalactan and aromatic impurities dissolved therein. The temperature range during the oxidative degradation step of the instant process preferably ranges from about 20° C. to about 70° C. The length of time required to complete the oxidative degradation of aromatic impurities has been found to be at least about 10 minutes, and preferably from about 10 minutes to about 60 minutes. Additional degradation times, however, have been found to have no detrimental effect and may in some instances afford a more uniform product particularly if relatively a low concentration of oxidizing agent is present, i.e. about 1 percent by weight based upon the combined weight of arabinogalactan and aromatic impurities. The pH of the aqueous medium during the instant step of the process while employing chlorine dioxide as the oxidizing agent may generally vary from about 1 to about 7. A preferred pH range when employing chlorine dioxide is about 3 to 5.

Alternatively, sodium dithionate may be used to accomplish the selective degradation of aromatic impurities, and to produce products which are soluble in water-miscible organic solvents. As previously described with respect to agents capable of producing oxidative degradation, sodium dithionate may be first dissolved to form an aqueous solution of a relatively dilute concentration, and subsequently mixed with the aqueous medium containing dissolved arabinogalactan and aromatic impurities.

At the termination of the step in the instant process in which the solubility of aromatic impurities in water-miscible organic solvents is substantially increased by use of an oxidizing agent such as chlorine dioxide, any excess oxidizing agent is preferably removed by passing gases such as steam or nitrogen through the aqueous medium. Such removal eliminates possible corrosion problems which may be otherwise encountered in subsequent steps of the process, and eliminates the possibility of further degradation. Additionally, concentration of the liquor may optionally be practiced, e.g. to about 10 to 15 percent dissolved solids by weight, so that a more highly concentrated resulting aqueous medium is obtained prior to subsequent treatment.

The resulting aqueous medium is next subjected to intimate contact with a water-miscible organic solvent which is a non-solvent for arabinogalactan to selectively precipitate the desired product while the aromatic impurities or the degradation products thereof remain largely in solution. Suitable water-miscible organic solvents include methanol, ethanol, propanol, isopropanol, acetone, dioxane, etc. Methanol is the particularly preferred water-miscible organic solvent for use in the instant process from the standpoint of both effectiveness and economics. While it is possible to carry out the precipitation of the arabinogalactan product at a temperature from about room temperature up to about 70° C. or the boiling point of the organic solvent whichever is lesser, it is particularly preferred to conduct this step of the process at a temperature in excess room temperature, since a precipitate of greater purity is thereby obtained. For instance, when methanol is used as the precipitation medium the temperature is preferably maintained at about 50° C. up to the boiling point of methanol, i.e. up to about 64.5° C. In a particularly preferred embodiment of the invention the temperature is maintained at about 50° C. up to about 60° C. during the precipitation. If temperatures much in excess of about 65° C. are utilized then a hazy supernatant liquid tends to result rather than a ready filterable precipitate. Temperatures in excess of about 70° C. are also detrimental to the arabinogalactan product.

When precipitation is conducted at an elevated temperature according to a preferred embodiment of the invention at least five parts by weight of the water-miscible organic solvent are contacted with each part by weight of the resulting aqueous medium to obtain an essentially complete precipitation of a readily filterable product. For instance at least about 5 parts by weight of methanol may be intimately contacted with each part by weight of the resulting aqueous medium at a temperature of about 50° C. to about 60° C. If the precipitation is conducted at about room temperature then about 3.5 to about 5 parts of methanol may be utilized per each part by weight of the resulting aqueous medium. When elevated temperatures are employed it is recommended that the precipitation be conducted in a closed system so that excessive amounts of solvent are not lost to the surroundings through volatilization. Intimate contact between the water-miscible organic solvent and the aqueous medium may be satisfactorily promoted by stirring. In a particularly preferred embodiment of the invention, the resulting aqueous medium is introduced into methanol such as by pouring while the methanol is agitated. The concentration of arabinogalactan in the aqueous medium during the precipitation step of the instant process may be as high as about 20 percent by weight, however, a slightly purer product is obtainable if the precipitation is conducted at a lower arabinogalactan concentration, i.e. about 10 percent by weight.

The arabinogalactan precipitate may be separated from the aqueous medium containing organic solvent by any suitable means such as by decantation, filtration, or centrifugation. If desired the product may be washed with an additional quantity of organic solvent to remove residual traces of aromatic impurities, and dried. The physical appearance of the product is generally that of a fluffy white powder or of a partly crystalline dense solid. The product obtainable by use of the present invention has a purity in excess of 99 percent by weight, is odorless, tasteless, and is capable of forming a clear, colorless solution when dissolved in water in a concentration of about 10 percent by weight. The product has the additional advantage of possessing high biological stability and is resistant to darkening and molding when exposed to air. An ultraviolet spectroscopy absorbence peak at a wavelength of 285 m$\mu$ characteristic of arabinogalactan products contaminated by aromatic impurities is found to be absent when the product obtained according to the present invention is analyzed.

The following example is given as a specific illustration of the invention. It should, be understood, however, that the invention is not limited to the specific details set forth in the example.

EXAMPLE 200 parts by weight of chips obtained from the wood of the *Larix occidentalis* tree identical to those commonly used in kraft pulping processes having a maximum linear dimension ranging from about ¾ inch to about 1½ inch and containing 50 percent by weight of moisture are placed in conventional countercurrent extractor of the multistage type. The chips are submerged, and 300 parts by weight of tap water are utilized as the aqueous extraction medium. The temperature of the water is maintained at room temperature, i.e. 24° C. for 24 hours while countercurrent flow of the aqueous extraction medium is maintained.

The aqueous medium is next passed over a 20 mesh screen to separate wood chips, is filtered, and then is passed through a continuous centrifuge to remove fine solid materials, i.e. wood fines, from the extraction medium. 240 parts by weight of the aqueous extraction medium which is brown in color are separated which includes 10 parts total weight of arabinogalactan and aromatic impurities dissolved therein. The aqueous medium containing dissolved solids is next placed in a corrosion resistant reactor equipped with a central agitator. 50 parts by weight of water containing 0.5 percent by weight of dissolved chlorine dioxide are added to the reactor. The contents of the reactor are maintained at room temperature, i.e. about 24° C., for 1 hour while under agitation.

Excess chlorine dioxide is purged with nitrogen gas, and the contents of the reactor are evaporated to 100 parts by weight. The temperature of the resulting aqueous medium which is colorless is elevated to 60° C. and the same is transferred to and slowly introduced into a closed reactor equipped with a central agitator and containing 500 parts by weight of methanol also at a temperature of 60° C. A white precipitate of arabinogalactan is formed immediately.

9.0 parts by weight of the precipitate are collected upon an enclosed filter, washed with 30 parts by weight of methanol, and dried at 65 to 70° C. by use of an air circulating oven. The product has a purity in excess of 99 percent by weight, and upon analysis by ultraviolet spectroscopy exhibits no significant absorbence peak at a 285 m$\mu$ wavelength.

The arabinogalactan product recovered from larch according to the present invention may be utilized as a substitute for gum arabic or other natural gums. It may find application in pharamaceuticals, adhesives, inks, and confectionery.

Although the invention has been described with preferred embodiments, it will be understood that variations and modifications may be resorted to as will be apparent to those skilled in the art. Such variations and modifications are to be considered within the purview and scope of the claims appended hereto.

I claim:
1. An improved process for the recovery of high purity arabinogalactan from larch comprising:
   (a) subjecting solid particulate larch to an aqueous medium whereby arabinogalactan and aromatic impurities initially present in the solid are extracted and dissolved in the aqueous medium,
   (b) separating said aqueous medium containing arabinogalactan and aromatic impurities dissolved therein from said solid particulate larch,
   (c) oxidatively degrading said aromatic impurities present in said aqueous medium by contacting them with an oxidizing agent selected from the group consisting of chlorine dioxide, chlorine water, peracetic acid, hydrogen peroxide, and sodium dithionate, whereby the solubility in water miscible/organic solvents of said aromatic impurities is substantially increased without a substantial modification in the properties of said arabinogalactan,
   (d) selectively precipitating solid arabinogalactan from said resulting aqueous medium by intimate contact with a water-miscible organic solvent which is a non-solvent for arabinogalactan, and
   (e) separating solid arabinogalactan of high purity.

2. An improved process for the recovery of high purity arabinogalactan from larch comprising:
   (a) subjecting solid particulate larch to an aqueous medium whereby arabinogalactan and aromatic impurities initially present in the solid are extracted and dissolved in the aqueous medium,
   (b) separating said aqueous medium containing arabinogalactan and aromatic impurities dissolved therein from said solid particulate larch,
   (c) oxidatively degrading said aromatic impurities present in said aqueous medium by reacting them with chlorine dioxide, whereby the solubility of said aromatic impurities is substantially increased without a substantial modification in the properties of said arabinogalactan,
   (d) selectively precipitating solid arabinogalactan from said resulting aqueous medium by intimate contact with a water-miscible organic solvent which is a non-solvent for arabinogalactan, and
   (e) separating solid arabinogalactan of high purity.

3. The process of claim 2, wherein said water-miscible organic solvent which is a non-solvent for arabinogalactan is methanol.

4. The process of claim 2, wherein said solid particulate larch is wood from the *Larix occidentalis* tree.

5. The process of claim 2, wherein:
   (a) the temperature of the aqueous medium to which said solid particulate larch is subjected is maintained at from about 15 to about 30 degrees centigrade,
   (b) said aromatic impurities present in said aqueous medium are oxidatively degraded by contacting them with chlorine dioxide for at least 10 minutes, and
   (c) said solid arabinogalactan is selectively precipitated from said resulting aqueous medium by intimate contact with at least 5 parts by weight of methanol per each part by weight of the resulting aqueous medium at a temperature of from about 50 degrees centigrade up to about the boiling point of the methanol.

6. The process of claim 5, wherein said solid particulate larch is wood from the *Larix occidentalis* tree.

7. The process of claim 5, wherein the selective precipitation of solid arabinogalactan is accomplished by introducing the resulting aqueous medium into said methanol with agitation.

8. An improved process for the recovery of high purity arabinogalactan from the wood of the *Larix occidentalis* tree comprising:
   (a) subjecting solid particulate wood chips having a maximum linear dimension from about ¾ inch to about 1½ inch to a circulating aqueous medium maintained at about 15° C. to about 30° C. for about 1 hour to about 48 hours whereby arabinogalactan and aromatic impurities initially present in the wood chips are extracted and dissolved in the aqueous medium,
   (b) separating said aqueous medium containing arabinogalactan and aromatic impurities dissolved therein from said wood chips,
   (c) oxidatively degrading said aromatic impurities present in said aqueous medium by contact with dissolved chlorine dioxide while maintained at about 20° C. to about 70° C. for about 10 minutes to about 60 minutes, said chlorine dioxide being initially present in a concentration of about 1 to about 5 percent by weight based upon the total weight of arabinogalactan and aromatic impurities present in said aqueous medium,
   (d) selectively precipitating solid arabinogalactan from said resulting aqueous medium by intimate contact with at least about 5 parts by weight of methanol per each part by weight of the resulting aqueous medium at temperature of about 50° C. to about 60° C., and
   (e) separating a solid arabinogalactan product of high purity.

9. An improved process according to claim 8 in which arabinogalactan and aromatic impurities are extracted from said wood chips by countercurrent extraction.

10. An improved process according to claim 8 in which the selective precipitation of arabinogalactan is accomplished by introducing the resulting aqueous medium into said methanol with agitation.

11. An improved process according to claim 8 in which the solid arabinogalactan product is a water-soluble white solid having a purity of at least 99 percent by weight.

References Cited

UNITED STATES PATENTS

| | | | |
|---|---|---|---|
| 2,073,616 | 3/1937 | Acree | 260—209 |
| 2,423,020 | 6/1947 | Haun | 260—110 |
| 3,189,596 | 6/1965 | Brink | 260—209 |
| 3,325,473 | 6/1967 | Herrick et al. | 260—209 |
| 3,337,526 | 8/1967 | Adams | 260—209 |

DONALD E. CZAJA, Primary Examiner

R. W. GRIFFIN, Assistant Examiner

U.S. Cl. X.R.

260—110